United States Patent
Rivoalen et al.

(10) Patent No.: US 12,034,792 B2
(45) Date of Patent: Jul. 9, 2024

(54) MANAGEMENT OF ADAPTIVE STREAMING OF AN ITEM OF DIGITAL CONTENT OVER A MOBILE NETWORK WITH SELECTION OF A MAXIMUM AUTHORIZED ENCODING RATE ON THE BASIS OF A DATA BUCKET

(71) Applicant: Orange, Issy-les-Moulineaux (FR)

(72) Inventors: Mathieu Rivoalen, Chatillon (FR); Hervé Marchand, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 17/764,077

(22) PCT Filed: Sep. 23, 2020

(86) PCT No.: PCT/FR2020/051656
§ 371 (c)(1),
(2) Date: Mar. 25, 2022

(87) PCT Pub. No.: WO2021/058910
PCT Pub. Date: Apr. 1, 2021

(65) Prior Publication Data
US 2022/0345511 A1    Oct. 27, 2022

(30) Foreign Application Priority Data

Sep. 27, 2019 (FR) ..................... 1910685

(51) Int. Cl.
*H04L 65/80* (2022.01)
*H04L 43/045* (2022.01)
(Continued)

(52) U.S. Cl.
CPC ............ *H04L 65/80* (2013.01); *H04L 43/045* (2013.01); *H04L 47/215* (2013.01); *H04L 47/38* (2013.01); *H04L 65/611* (2022.05); *H04L 65/613* (2022.05)

(58) Field of Classification Search
CPC ..... H04L 65/80; H04L 43/045; H04L 47/215; H04L 47/38; H04L 65/611; H04L 65/613;
(Continued)

(56) References Cited

U.S. PATENT DOCUMENTS 6,532,308 B1 * 3/2003 Goertzen ............... H04N 19/63
375/E7.059
10,200,272 B1   2/2019 Trundle
(Continued)

OTHER PUBLICATIONS

International Search Report for International Application No. PCT/FR2020/051656, dated Dec. 22, 2020.

*Primary Examiner* — Oanh Duong
(74) *Attorney, Agent, or Firm* — Knobbe, Martens, Olson & Bear, LLP

(57) ABSTRACT

A method for managing adaptive streaming of an item of digital content within a multimedia stream reading terminal connected to a mobile communication network is disclosed. The item of digital content is associated with a description file for the item and includes a list of time segments of the item of content that are each associated with multiple encoding rates of the item of content. A maximum data volume to be consumed within the mobile communication network, as a data bucket, is allocated to the multimedia stream reading terminal. When the adaptive streaming of the item is launched, the method determines a data volume that would be consumed by the multimedia stream reading terminal as a result of streaming the time segments and selects a maximum encoding rate of the item authorized for the streaming on the basis of the consumed data volume associated therewith and of the data bucket.

10 Claims, 2 Drawing Sheets

(51) Int. Cl.
*H04L 47/215* (2022.01)
*H04L 47/38* (2022.01)
*H04L 65/611* (2022.01)
*H04L 65/613* (2022.01)

(58) Field of Classification Search
CPC ............ H04N 21/2343; H04N 21/431; H04N 21/44245
See application file for complete search history.

(56) References Cited

U.S. PATENT DOCUMENTS

| | | | |
|---|---|---|---|
| 2008/0126103 A1* | 5/2008 | Heo | G11B 20/10 704/500 |
| 2009/0046739 A1 | 2/2009 | Ebling et al. | |
| 2014/0105285 A1* | 4/2014 | Gao | H04N 19/10 375/240.06 |
| 2014/0297881 A1 | 10/2014 | Shivadas et al. | |
| 2016/0044110 A1* | 2/2016 | Branam | H04L 67/1097 709/219 |
| 2016/0192296 A1* | 6/2016 | Rehan | H04N 21/23439 455/574 |
| 2017/0013031 A1* | 1/2017 | Kweon | H04L 65/1045 |
| 2018/0176333 A1* | 6/2018 | Bouvigne | H04L 65/612 |

* cited by examiner

MANAGEMENT OF ADAPTIVE STREAMING OF AN ITEM OF DIGITAL CONTENT OVER A MOBILE NETWORK WITH SELECTION OF A MAXIMUM AUTHORIZED ENCODING RATE ON THE BASIS OF A DATA BUCKET

CROSS-REFERENCE TO RELATED APPLICATIONS

This application is filed under 35 U.S.C. § 371 as the U.S. National Phase of Application No. PCT/FR2020/051656 entitled "MANAGEMENT OF ADAPTIVE STREAMING OF AN ITEM OF DIGITAL CONTENT OVER A MOBILE NETWORK WITH SELECTION OF A MAXIMUM AUTHORIZED ENCODING RATE ON THE BASIS OF A DATA BUCKET" and filed Sep. 23, 2020, and which claims priority to FR 1910685 filed Sep. 27, 2019, each of which is incorporated by reference in its entirety.

BACKGROUND

Field

The field of the development is that of digital multimedia contents, namely digital video and/or audio contents. More specifically, the development relates to managing the data consumption of a user desiring to access digital contents according to a so-called adaptive streaming technique, through a mobile communication network.

Description of the Related Technology

Access to an item of multimedia content, such as television or video on demand, is currently possible, for most rendering terminals, even when they are in mobility situation, through a mobile communication network of the 4G type for example.

The terminal generally emits a request to a server, by indicating the chosen content and it receives in return a stream of digital data relating to this content.

The terminal is adapted to receive these digital contents in the form of multimedia data and to produce a rendering thereof. This rendering involves providing at the terminal the item of digital content in a form accessible to the user. For example, data received corresponding to a video are generally decoded, then rendered at the terminal in the form of a display of the corresponding video with its associated sound track. In the following, in the interest of simplification, the item of digital content will be assimilated as a video and the rendering by the terminal, or consumption by the user of the terminal, as a viewing on the screen of the terminal.

The broadcasting of digital contents is often based on client-server protocols of the HTTP (Hyper Text Transport Protocol) family. In particular, the downloading in progressive mode of digital contents, also referred to as streaming, makes it possible to transport and consume the data in real time, that is to say that the digital data are transmitted over the network and rendered by the terminal as and when they arrive. The terminal receives and stores a portion of the digital data in a buffer memory before rendering them. This broadcasting mode is particularly useful when the bitrate that the user disposes is not guaranteed for the real-time transfer of the video, which is most particularly the case when the terminal is connected to a mobile communication network, for example a network of the 4G type, known for its bandwidth variabilities.

HTTP adaptive streaming (HAS for short), what is more makes it possible to broadcast and receive data according to various qualities corresponding for example to various bitrates. These various qualities are described in a parameter file available by downloading on a data server, for example a content server. When the client terminal desires to access an item of content, this description file makes it possible to select the correct format for the item of content to be consumed depending on the available bandwidth or the storage and decoding capacities of the client terminal. This type of technique particularly makes it possible to take into account variations in bandwidth on the link between the client terminal and the content server.

A plurality of technical solutions exist to facilitate the broadcasting of such an item of content by streaming, such as for example the proprietary solutions Microsoft® Smooth Streaming, Apple® HLS, Adobe® HTTP Dynamic Streaming or the MPEG-DASH standard of the ISO/IEC organisation that will be described hereafter. These methods propose to send to the client one or more intermediate description files, also referred to as documents or manifests, containing the addresses of the various segments with the various qualities of the multimedia content.

Thus, the MPEG-DASH (Dynamic Adaptive Streaming over HTTP) standard is a format standard for audiovisual broadcasting over the Internet. It is based on the preparation of the content in various presentations of variable quality and bitrate, sliced into short-term segments (in the order of a few seconds), also referred to as chunks. Each of these segments is rendered available individually by means of an exchange protocol. The protocol mainly targeted is the HTTP protocol, but other protocols (for example FTP) may also be used. The organisation of segments and the associated parameters are published in a manifest in XML format.

The underlying principle to this standard is that the MPEG-DASH client performs an estimation of the available bandwidth for the receipt of segments, and, depending on the filling of its reception buffer, chooses, for the next segment to be loaded, a representation the bitrate of which:
ensures the best possible quality,
and makes possible a reception delay compatible with the uninterrupted rendering of the content.

Thus, in order to adapt to the variation in network conditions, particularly in terms of bandwidth, the existing adaptive streaming solutions make it possible for the client terminal to switch from an encoded version of the content at a certain bitrate, to another encoded at another bitrate, during the streaming. Indeed, each version of the content is divided into segments of the same duration. In order to make it possible to continuously render the content on the terminal, each segment must reach the terminal before its programmed rendering instant. On the one hand, the perceived quality associated with a segment increases with the size of the segment, expressed in bits, but on the other hand, larger segments require a longer transmission time, and therefore have an increased risk of not being received in time for a continuous rendering of the content.

The rendering terminal must therefore find a compromise between the overall quality of the content, and its uninterrupted rendering, by carefully selecting the next segment to be downloaded, from the various encoding rates proposed. For this, various algorithms exist for selecting the quality of the content depending on the available bandwidth, which may have more or less aggressive, or more or less secure strategies.

The consumption of digital contents during HTTP adaptive streaming (HAS) is tending to become more accessible.

It is particularly used by many streaming services, but also by certain TV decoders, or set-top-boxes, which use it to access offline content, such as Video on Demand (VOD), the pre-recording of television programmes (Replay), or offers of the type Network PVR (Network Personal Video Recorder, i.e. a service for recording digital contents, performed by the content provider itself rather than in the home of the end user).

Furthermore, other devices such as real-time multimedia stream playerplayer devices also access digital contents in HTTP adaptive streaming mode for real-time (or Live) televisual contents. This is the case for example of the Chromecast® device developed by Google®, or of the CléTV® from Orange®. Such devices, more generically designated under the name of HDMI Key, may also be used to access contents of the video on demand type.

Such devices conventionally plug into the HDMI port of a television and communicate, for example by Wi-Fi® connection, with another device of the home communication network connected to a wide area communication network (for example a smartphone, connected to a 4G mobile network), in order to render, on the television, the multimedia content received by a compatible software application. These devices will subsequently be designated under the generic designation of HDMI Key.

In this specific context of broadcasting contents over a mobile communication network, it is important to take into account the data consumption limit authorised for the client terminal. This limit may correspond to a data volume associated with a prepaid card purchased by the user, or with a monthly plan that they have signed up to with the operator of the wide area communication network, for example the mobile network. This maximum consumable data volume is more commonly designated under the term of data bucket. In mobile language, the data represents the data downloaded on a telephone or a mobile terminal by virtue of the Internet. A mobile data plan therefore makes it possible for users to browse the Internet with a mobile telephone, according to specific volumes allocated by the operator of the network. Unlimited plans in this field do not strictly speaking exist. Data plans include a maximum authorised data volume, generally expressed in Megabits or Gigabits.

When the user consumes an item of content or a data stream according to an HTTP adaptive streaming (HAS) technique over a mobile communication network, the objective of its HAS client embedded on its multimedia stream playerplayer terminal is, by principle, to achieve the best possible rendering quality for the user, depending on resource and bandwidth constraints, and therefore to target the maximum encoding rate available for the item of content to be streamed. As a result, the streaming of content may consume a very large proportion, or even all, of the data bucket allocated to the user, without the latter having any means of action to prevent it. Indeed, the only option that the user has is, fairly radically, to renounce accessing the stream, and therefore to renounce watching the item of multimedia content chosen.

This situation proves to be problematic insofar as it may lead the user, in mobility situation, to exceed their "data bucket", which may prove to be expensive, or to consume all of it right at the beginning of the month, depriving them of resources for the end of the period.

Therefore, there is a need for a technique for managing the HTTP adaptive streaming of content, particularly for a user connected to a mobile communication network, making it possible to better control their data consumption, in relation to prior solutions. In particular, there is a need for such a technique that makes it possible for a user to view an item of content in HAS via a mobile network, while ensuring them control of the consumption of their data bucket.

SUMMARY OF CERTAIN INVENTIVE ASPECTS

The development meets this need by proposing a method for managing the HTTP adaptive streaming (HAS) of an item of digital content within a real-time multimedia stream playerplayer terminal connected to a mobile communication network. The item of digital content is associated with a description file, comprising a list of time segments of the item of content each associated with a plurality of encoding rates of the item of content. A maximum volume of data to be consumed within the mobile communication network, referred to as data bucket, is allocated to the multimedia stream playerplayer terminal.

According to the development, when the HTTP adaptive streaming of the item of digital content is launched, such a management method:

determines a data volume that would be consumed by the multimedia stream playerplayer terminal as a result of streaming the time segments of the item of content at at least certain encoding rates, selects a maximum encoding rate of the item of content authorised for the streaming, on the basis of the consumed data volume associated therewith and of the data bucket.

Thus, the development is based on an entirely novel and inventive approach for the HTTP adaptive streaming of content, in the case where the multimedia stream playerplayer terminal disposes a maximum volume of consumable data within its content access network. Such a data consumption limit value, also referred to as "data bucket", may correspond to a data volume authorised as part of a monthly plan signed up to with an operator of the network, or associated with a prepaid card purchased from this operator.

The method according to one embodiment of the development proposes to take into account this "data bucket" in the choice of the encoding rate at which the HAS client embedded on the multimedia stream playerplayer terminal streams the time segments of the item of content. Thus, instead of systematically streaming the time segments of the item of content at the maximum accessible encoding rate, given the constraints of the network and of the content server, the data consumption resulting from the streaming of the item of content at various encoding rates is evaluated; by taking into account, this consumption evaluation on the one hand, and the data bucket of the user on the other hand, a maximum encoding rate is selected making it possible to restrict the HTTP adaptive streaming (HAS) of the item of content, in order to better control the proportion of the data bucket dedicated to this streaming.

It is thus possible for the user to benefit from advantages of the HTTP adaptive streaming (HAS) of content, without this being carried out to the detriment of their data bucket, which must be able to be used for other purposes or for other applications: thus, the user is offered interesting tools for controlling his/her data consumption.

According to an advantageous feature, such a management method also comprises a display, on a rendering terminal associated with the multimedia stream playerplayer terminal, of consumed data volumes determined for at least certain encoding rates.

The users may thus easily have knowledge of the data volume that will be consumed by their terminal if they launch the streaming of the item of content that they have chosen, at one or other of the available encoding rates: for this, they simply consult the screen of their rendering terminal, on which these volumes are presented to them. This is particularly advantageous when the users are in mobility solution, and when they do not necessarily understand the impact that launching the streaming of content will have on their data consumption and therefore on their data bucket. A consultation of the screen of their rendering terminal (for example their mobile phone) directly indicates to them, for example in the form of a comparative table, the data volumes, for example expressed in Gigabits or in Megabits, associated with the various encoding rates of the item of content.

In order to simplify the calculation, the assumption is made for example that all of the time segments of the item of content will be streamed at the same encoding rate, or at the same resolution, without taking into account possible fluctuations associated with changes of resource constraints of the network or of the content server.

It will be noted that the rendering terminal may be the multimedia stream playerplayer terminal itself (for example a smartphone), or be different from this (for example a television connected to an HDMI Key).

According to an advantageous optional feature, the consumed data volumes, determined for at least certain encoding rates, are displayed in the form of a proportion of the data bucket.

The user may thus directly understand what percentage of his/her data bucket will be consumed in the event of launch of the streaming of the item of content at such or such a rate. Such a presentation is more meaningful and understandable for the user. Of course, it requires that this data bucket be known by the multimedia stream playerplayer terminal.

According to another advantageous optional feature, such a management method also comprises a display, on the rendering terminal, of a data volume yet to be consumed by the multimedia stream playerplayer terminal, at the end of streaming the time segments of the item of content at at least certain encoding rates.

Thus, the users know, not only, what data volume will be consumed as a result of streaming of the item of content, but also what data volume they will still have at the end of this streaming, taking into account their data bucket, and optionally the proportion that they have already consumed thereof. This display of remaining volume may be carried out in Gigabits/Megabits, or as a percentage of the bucket. The users may thus easily choose the maximum encoding rate at which they want to be limited, in order not to consume too large a portion of their data bucket, and to keep enough data credit, for example until the end of the month.

According to another advantageous feature, the data volumes displayed correspond to only encoding rates for which the streaming of the time segments of the item of content does not result in the data bucket being exceeded.

Thus, if the data bucket of the user is known, it is possible to indicate to them only the encoding rates to which they may be entitled to be able, as a minimum, to fully see the item of content, if they no longer have enough consumable data to see it in maximum quality.

According to another feature, such a management method also comprises an entry, on a rendering terminal associated with a multimedia stream playerplayer terminal, of the data bucket.

Thus, the users pre-enter their data bucket, so that this information is accessible to the multimedia stream player terminal. This entry may be carried out during a phase for installing or configuring the HTTP adaptive streaming service. It may also be requested from the users via the display of a "pop-in" type window, which informs them of a new product on the service, and questions them about this new useful information that is their data bucket.

As a variant, if the operator of the mobile network end-to-end controls the HTTP adaptive streaming service, it may extract the information of the data bucket of the users from their profile or from their billing, so that it is accessible to the multimedia stream playerplayer terminal.

According to one embodiment of the development, the selection of the maximum encoding rate of the item of content authorised for the streaming is performed by a user via an interface of a rendering terminal associated with the multimedia stream playerplayer terminal.

Thus, the users themselves choose the maximum encoding rate to be defined, via the interface of their rendering terminal, for example by selection of a highlighted menu or by entry in a pop-in window. This selection may only be valid for a given item of content, or may be taken into account for all of the contents accessible via the HTTP adaptive streaming (HAS) service, or also for all of the contents streamed during a given period (for example during the current month).

The development also relates to a computer program product comprising program code instructions for implementing a method as described above, when it is executed by a processor.

The aim of the development is also a computer-readable recording medium whereon a computer program is recorded comprising program code instructions for executing the steps of the method for managing the HTTP adaptive streaming (HAS) of an item of digital content according to the development, as described above.

Such a recording medium may be any entity or device capable of storing the program. For example, the medium may include a storage means, such as a ROM, for example a CD ROM or a microelectronic circuit ROM, or also a magnetic recording means, for example a USB key or a hard drive.

On the other hand, such a recording medium may be a transmissible medium such as an electrical or optical signal, which may be routed via an electrical or optical cable, by radio or by other means, so that the computer program that it contains can be executed remotely. The program according to the development may in particular be downloaded on a network for example the Internet network.

Alternatively, the recording medium may be an integrated circuit wherein the program is incorporated, the circuit being adapted to execute or to be used in the execution of the aforementioned display control method.

The development also relates to a device for managing the HTTP adaptive streaming (HAS) of an item of digital content within a multimedia stream player terminal connected to a mobile communication network. Such an item of digital content is associated with a description file, comprising a list of time segments of the item of content each associated with a plurality of encoding rates of the item of content; a maximum data volume to be consumed within the mobile communication network, referred to as data bucket, is allocated to the multimedia stream player terminal.

According to the development, such a device comprises:
a module for determining a data volume that would be consumed by the multimedia stream player terminal as a result of streaming the time segments at least certain encoding rates, a module for selecting a maximum encoding rate of the item of content authorised for the streaming, on the basis of the consumed data volume associated therewith and of the data bucket.

According to one embodiment, such a device for managing the HTTP adaptive streaming (HAS) of an item of digital content also comprises a module for transmitting a command, to a rendering terminal associated with the multimedia stream player terminal, for displaying consumed data volumes determined for at least certain encoding rates.

Such a command may be a command internal to the device when the latter is integrated into the rendering terminal itself.

The development also relates to a multimedia stream player terminal that comprises a device for managing the HTTP adaptive streaming (HAS) of an item of digital content as described above.

The device for managing the HTTP adaptive streaming, the multimedia stream player rendering terminal and the computer program according to embodiments of the development have in combination all or part of the features disclosed in the whole of this document. In particular, they have at least the same advantages as those conferred by the method for managing the HTTP adaptive streaming of an item of content according to one embodiment of the present development.

BRIEF DESCRIPTION OF THE DRAWINGS

Other aims, features and advantages of the development will become more apparent upon reading the following description, given by way of simple illustrative, and non-limiting example, in relation to the figures, wherein.

DETAILED DESCRIPTION OF CERTAIN ILLUSTRATIVE EMBODIMENTS

The general principle of the development is based on the possibility, within the scope of the HTTP adaptive streaming of an item of content, of selecting the maximum authorised encoding rate of the item of content for the streaming, in order not to consume too large a proportion of the data bucket of the user, particularly when they are in mobility situation.

Figure 1:
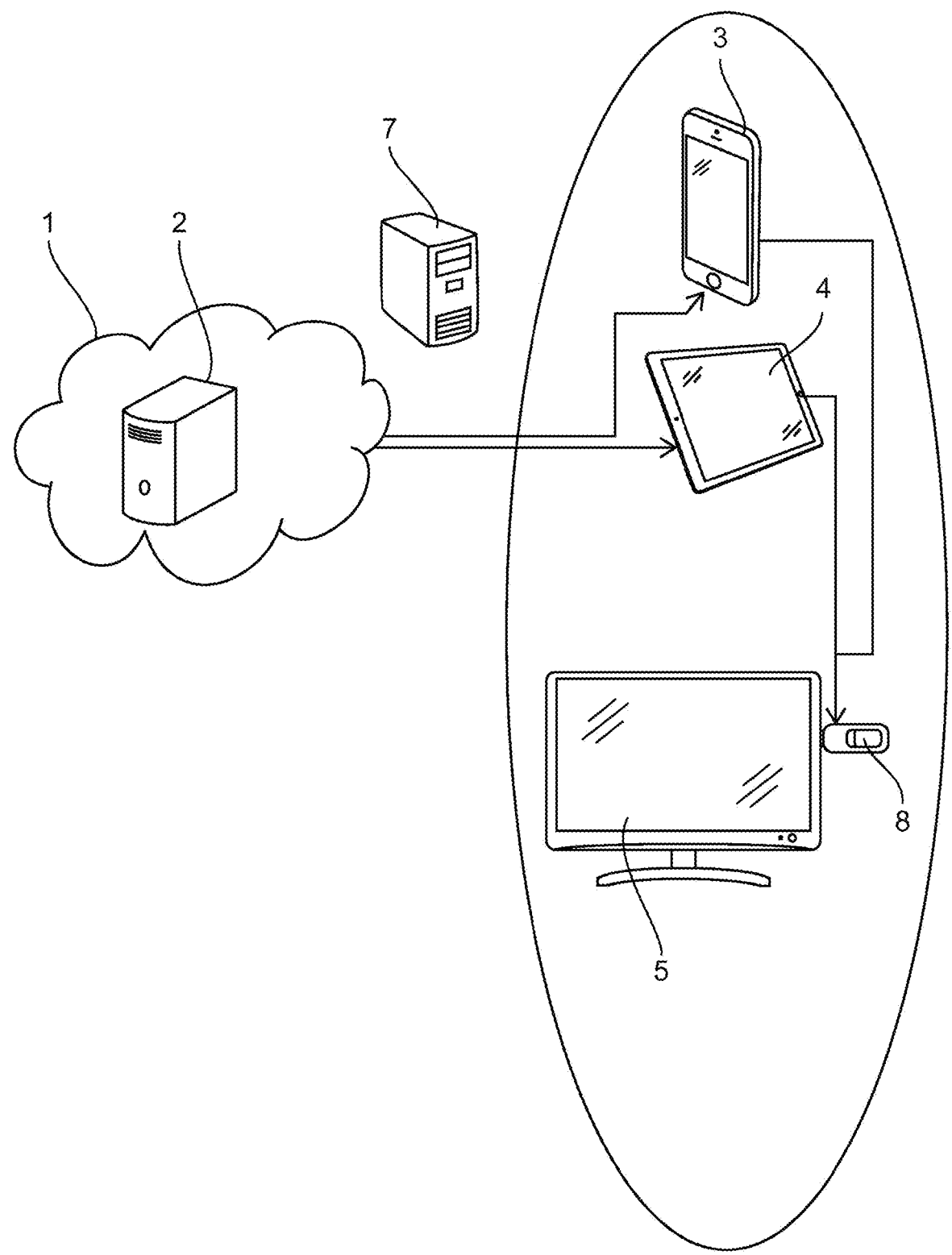
FIG. 1 shows an HTTP streaming architecture over mobile network based on the use of the adaptive streaming according to the development.

It is now presented, in relation to FIG. 1, a streaming architecture based on the use of the adaptive streaming according to the development.

The terminal 3, for example a smartphone and the terminal 4, for example a tablet, are, in this example, connected to a wide area mobile communication network 1, for example a network of the 4G type. They communicate with a terminal 8, for example an HDMI key connected to a television 5.

A digital content server 2 is according to this example in the wide area network (WAN, 1) and receives for example digital television content channels from a broadcast television network, not shown, and/or videos on demand, and makes them available to the client terminals.

The client terminals 3 and 4 may enter into communication with the content server 2 in order to receive one or more contents (films, documentaries, advertising sequences, etc.).

It is frequent, in this client-server context, to resort, for exchanging data between the client terminals 3, 4 and the server 2, to an HTTP adaptive streaming technique, HAS for short, based on the HTTP protocol. This type of technique particularly makes it possible to offer a good quality of contents to the user by taking into account bandwidth variations that may occur on the link between the client terminal 3 and 4 and the content server 2.

Conventionally, various qualities may be encoded for the same content of a channel, corresponding for example to various bitrates. More generally, quality will be mentioned to refer to a certain resolution of the digital content (spatial, temporal resolution, quality level associated with the video and/or audio compression) with a certain bitrate. Each quality level is itself sliced on the content server into time segments (or fragments, chunks, these three words being used indifferently in the whole of this document).

The description of these various qualities and of the associated time segmentation, as well as the content fragments, are described for the client terminal and made available to it via their Internet addresses (URI: Universal Resource Identifier). All of these parameters (qualities, addresses of the fragments, etc.) are in general grouped into a parameter file, referred to as description file. It will be noted that this parameter file may be a computer file or a set of information describing the content, accessible at a certain address.

The terminals 3, 4 possess their own features in terms of capacity of decoding, of display, etc. In a context of HTTP adaptive streaming, they may adapt their requests to receive and decode the content requested by the user with the quality that best corresponds to them. In our example, if the contents are available at the bitrates 512 kb/s (kilobits per second) (Resolution 1, or level 1, noted N1), 1024 kb/s (N2), 2048 kb/s (N3) and that the client terminal has a bandwidth of 3000 kb/s, it may request the content at any bitrate below this limit, for example 2048 kb/s. Generally, the content number i is noted "Ci@Nj" with the quality j (for example the j-th quality level Nj described in the description file).

The client terminals 3, 4 receive the data from the wide area mobile network 1 and ensure their decoding, and optionally their rendering on their screen, or their transmission to the HDMI key 8 for rendering on the screen of the television 5. As a variant, the decoders may be elsewhere in the network, particularly at the level of a STB (Set-Top-Box) type network (not shown) associated with a television.

In this example, to view an item of content, the terminal 3, 4 or 8 firstly retrieves an address for the desired description document 7 of the item of content (for example, C1). In the following, it will be assumed that this file is a manifest type file according to the MPEG-DASH standard (noted "C.mpd") and reference will be made indifferently, according to the context, to the expression "description file" or "manifest". This file may be retrieved directly from an Internet server of the wide area network 1, or already be on the terminal at the time of the request.

An example of manifest file (MPD) in accordance with the MPEG-DASH standard and including the description of contents available in three different qualities (N1=512 kb/s, N2=1024 kb/s, N3=2048 kb/s) of the fragmented contents is presented in Appendix 1. This simplified manifest file describes digital contents in an XML (eXtended Markup Language) syntax, comprising a list of contents in the form of fragments conventionally described between an opening tag (<SegmentList>) and a closing tag (</SegmentList>). The slicing into fragments particularly makes it possible to precisely adapt to fluctuations of the bandwidth. Each fragment corresponds to a certain duration ("duration" field) with a plurality of quality levels and makes it possible to generate their addresses (URL—Uniform Resource Locator). This generation is carried out in this example with the aid of "BaseURL" elements ("HTTP://server.com") that indicates the address of the content server and "SegmentURL" that lists the complementary portions of the addresses of the various fragments:

"C1_512kb_1.mp4" for the first fragment of the item of content "C1" at 512 kilobits per second ("kb") in MPEG-4 ("mp4") format,
"C1_512kb_2.mp4" for the second fragment,
etc.

Once it has the addresses of fragments corresponding to the desired content, the terminal carries out the obtaining of the fragments via a downloading of these addresses. It will be noted that this downloading is carried out here, traditionally, through an HTTP URL, but may also be carried out through a universal address (URI) describing another protocol (dvb://mysegmentofcontent for example).

It is assumed here that the HDMI key 8 is connected to the television 5 by plugging into the HDMI port of the latter, and is used to render, on the screen of the television 5, an item of content C1, described in a manifest file 7. It will be noted that the item of content C1 may be a television programme broadcast live or in replay, or a video on demand, or any other multimedia content of determined or determinable duration.

In this example, the HDMI key 8 is WiFi® connected directly to the tablet 4 or to the smartphone 3, by means of which it may access the wide area communication network 1, for example via a 4G connection.

The HDMI key 8 may also be controlled by the user by means of the smartphone 3, on which a software application for controlling the HDMI key 8 is installed.

The content fragments obtained by the smartphone 3 or the tablet 4 are for example transmitted by WiFi® to the HDMI key 8, which controls their display on the screen of the television 5, for rendering to the user.

Figure 2:
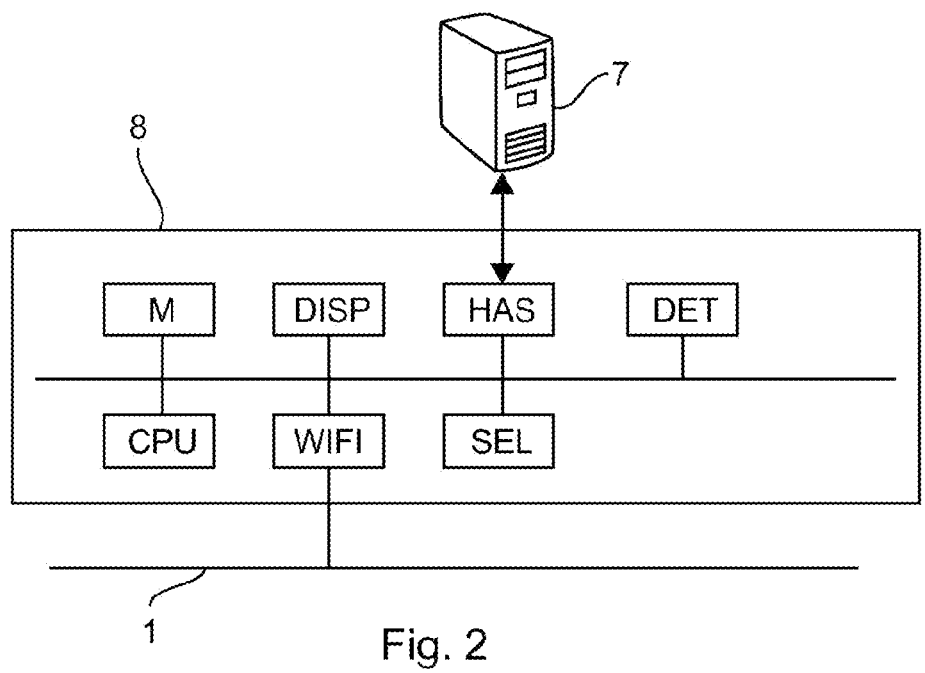
FIG. 2 schematically illustrates the hardware structure of a multimedia stream player terminal integrating a device for managing HTTP adaptive streaming according to one embodiment of the development.

FIG. 2 represents an architecture of a multimedia stream player terminal according to one embodiment of the development, for example the HDMI key 8, or the smartphone 3, of FIG. 1. The example of the HDMI key 8 is described more specifically in the following.

Conventionally, it comprises memories M associated with a processor CPU. The memories may be of the ROM (Read Only Memory) or RAM (Random Access Memory) or Flash type. The HDMI key 8 communicates with the wide area Internet network 1 via the WIFI module for a local wireless communication with another communication terminal, for example the smartphone 3. The HDMI key 8 further comprises an HTTP adaptive streaming (HAS) module capable of requesting a progressive downloading of one of the contents with one of the qualities proposed in a description file 7. This description file 7 may be saved for example in the memories M of the HDMI key 8 or be outside.

The HDMI key 8 also comprises a DET module for determining a data volume that would be consumed by HTTP adaptive streaming of an item of content, with the various qualities proposed in the description file 7.

It also comprises a DISP module for controlling the display of data volumes determined by the DET module on a screen of a rendering terminal, for example the smartphone 3 or the television 5. More generally, such a DISP module is a module for managing the interface with the rendering terminal of the user, by which the HDMI key 8 obtains for example information on the possible interactions of the user with the rendering terminal (action on the remote control of the television for example by pressing on the volume key or a channel change key, or selection in a highlighted menu on the screen of the television of a maximum authorised content quality, or selection of this maximum quality on the touch screen of the smartphone 3 or of the tablet 4), and by which it may control the display on the screen of the rendering terminal of pop-up windows, making it possible for it to deliver messages, information on the consumed or remaining data volumes, or alerts to the user.

It also comprises a SEL module for selecting a maximum encoding rate or a maximum resolution authorised for streaming the item of content, which controls the HTTP adaptive streaming (HAS) module, in order to force the latter to request a streaming of the item of content with a quality, proposed in the description file 7, lower than the optimal quality at which it may be entitled, in the case where this optimal quality is higher than the maximum quality selected via the SEL module.

The HDMI key 8 according to one embodiment of the development may also contain other modules such as a hard drive (not shown) for storing the video fragments, a module for controlling access to the contents, a module for processing the commands received from a tablet or from a smartphone on which the application for controlling the HDMI key is installed, thanks to which the user may control therefrom the operation, etc. Indeed, such an HDMI key 8 generally does not contain an I/O interface module, and the I/O interface module of the smartphone 3 of the user or of his/her tablet 4, or of the television 5 is used by the latter to choose for example its content.

It will be noted that the term module may correspond to a software component as well as a hardware component or a set of software and hardware components, a software component itself corresponding to one or more computer programs or subprograms or more generally to any element of a program capable of implementing a function or a set of functions such as described for the modules concerned. In the same manner, a hardware component corresponds to any element of a hardware assembly capable of implementing a function or a set of functions for the module concerned (integrated circuit, smart card, memory card, etc.).

More generally, such an HDMI key 8 comprises a random access memory (for example a RAM memory), a processing unit equipped for example with a processor CPU, and controlled by a computer program, representative of a module for managing the HTTP adaptive streaming (HAS), stored in a read-only memory (for example a ROM memory or a hard drive). Upon initialization, the code instructions of the computer program are for example loaded into the random access memory before being executed by the processor CPU of the processing unit. The random access memory particularly contains the manifest description file 7. The processor of the processing unit controls the determination of data volumes consumed as a result of streaming of the item of content with its various quality levels, the display of pop-up windows on the screen of the rendering terminal, and the restriction of the quality of the item of content streamed, through the choice of time segments and associated encoding rates to be streamed, and the emission of corresponding commands to the HAS client module.

In the case where the multimedia stream player terminal considered is not the HDMI key 8 but, for example, the smartphone 3, the architecture proposed in FIG. 2 remains the same, with the exception that the terminal communicates directly with the wide area communication network via a mobile communication module, for example of the 4G type, instead of the WIFI module. The rendering terminal is then the multimedia stream player terminal itself, so that the DISP module for commanding the display controls the display of estimated data volumes directly on the screen of the smartphone 3, and the SEL module directly receives the value of the maximum authorised quality of the item of content selected by the user on the screen of the smartphone 3 itself.

FIG. 2 only illustrates a particular way, from a plurality possible, to produce a multimedia stream player terminal, so that it performs the steps of the method detailed below, in relation to FIG. 3 (in any one of the various embodiments, or in a combination of these embodiments). Indeed, these steps may be performed indifferently on a reprogrammable calculation machine (a PC computer, a DSP processor or a microcontroller) executing a program comprising a sequence of instructions, or on a dedicated calculation machine (for example a set of logic gates such as a FPGA or an ASIC, or any other hardware module).

Figure 3:
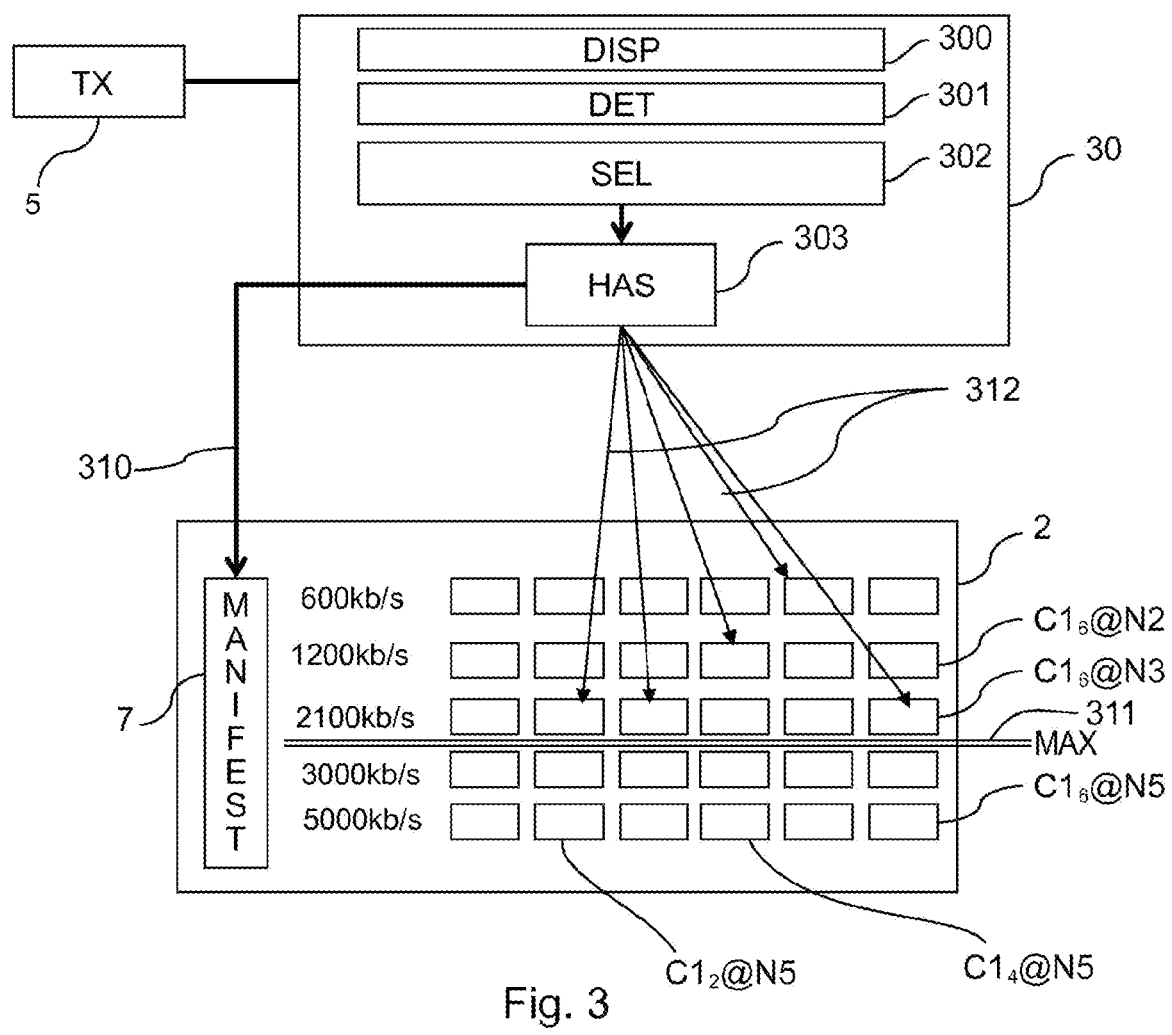
FIG. 3 describes an example of restricting the maximum quality of a multimedia stream obtained in HTTP adaptive streaming mode by a multimedia stream player terminal of FIG. 1 or FIG. 2.

It is now presented, in relation to FIG. 3, an example of restriction of the maximum quality of a multimedia stream obtained in HTTP adaptive streaming mode by a multimedia stream player terminal 30, for example the HDMI key 8 or the smartphone 3 of FIG. 1 and FIG. 2.

The multimedia stream player terminal 30 is connected to a rendering terminal TX (for example the HDMI key 8 is connected to the television 5 by means of the HDMI link or to the smartphone 3 by means of a WIFI link). It comprises a DISP module 300 for interfacing with the rendering terminal TX, a DET module 301 for determining the data volume consumed as a result of streaming of an item of content at its various encoding rates, a SEL module 302 for selecting a maximum authorised encoding rate for the streaming, and an HAS client module 303.

An HAS content server 2 discloses a video C1 in the form of chunks $C1_i@Nj$ encoded at various encoding rates Nj, where the index i designates a time identifier of the chunk $C1_i@Nj$.

According to the prior art, an HAS client module is responsible for retrieving its chunks from the HAS content server 2 by choosing the video quality Nj depending on the available network resource. It is not described in more detail here the manner in which the HAS client module chooses the encoding rate of the next video fragment to be downloaded: indeed many algorithms exist making it possible to make this choice, the strategies of which are more or less secure or aggressive. However, it is reminded that, most often, the general principle of such algorithms is based on downloading a first fragment at the lowest encoding rate proposed in the manifest, and evaluating the time for retrieving this first fragment. On this basis, the HAS client module evaluates whether, depending on the size of the fragment and of the time taken to retrieve it, the network conditions make it possible to download the following fragment at a higher encoding rate. Certain algorithms are based on a progressive increase of the quality level of the downloaded content fragments; others propose riskier approaches, with jumps in the levels of the encoding rates of the successive fragments.

In the conventional case, if a video chunk lasts 3 seconds, the retrieval of the chunk by the HAS client module must not exceed 3 seconds, in order to make it possible to render without interruption the content by the terminal 30. Therefore, the HAS client module should make the best compromise between a rendering quality, and therefore an encoding rate, as high as possible, and the time for downloading the fragment, which must be short enough to make it possible to continuously render on the rendering terminal TX.

In the embodiment illustrated in FIG. 3, on the other hand, the HAS client module 303 may not command the streaming of the fragment at the optimal encoding rate, in order to limit the consumption of the data bucket of the user, as described in detail in the following.

During a step referenced 310, the HAS module 303 retrieves the manifest file 7 in order to discover the available fragments of the video content C1, and the various associated video qualities Nj.

It is considered for example the case of a customer who wants to watch a two-hour video on demand (VOD), by using his/her CléTV® 8 and his/her smartphone 3 in modem mode (4G personal hotspot).

It is assumed that on the HDMI Key 8 that he/she wants to use, the technology for transporting the multimedia stream is of the HAS type with five levels of encoding rate and resolution available, according to the example given in the table [Table 1] below.

TABLE 1

| Resolution | Bitrate |
| --- | --- |
| 320 × 180 pixels | 600 kb/s |
| 569 × 320 pixels | 1.2 Mb/s |
| 1024 × 576 pixels | 2.1 Mb/s |
| 1280 × 720 pixels | 3 Mb/s |
| 1920 × 1080 pixels | 5 Mb/s |

Thus, in the example in FIG. 3, the item of content C1 is for example proposed in the form of fragments of duration 3 s, with a first encoding rate N1=600 kb/s, a second encoding rate N2=1200 kb/s, a third encoding rate N3=2100 kb/s, etc.

In a normal operating mode, not illustrated in FIG. 3, the HAS module 303 carries out the streaming for example, of successive fragments $C1_1@N1$ (i.e. the first time fragment at an encoding rate of 600 kb/s), then $C1_2@N3$ (i.e. the second time fragment at an encoding rate of 2100 kb/s), then $C1_3@N3$ (i.e. the time fragment at an encoding rate of 2100 kb/s), etc.

The various fragments streamed by the HAS client module 303 are transmitted to the interface module DISP 300 for their rendering to the user on the screen of the rendering terminal TX.

The algorithm implemented by the HAS client module 303 to determine which fragment at which encoding rate must be streamed in normal operating mode (that is to say outside of the restriction of the encoding rate by the SEL module 302) may be one of the already existing algorithms of the prior art. This algorithm will therefore not be described here in more detail.

At the same time, in accordance with FIG. 3, the DET module 301 determines the data volume that would be consumed as a result of streaming the item of content C1 at the various levels of resolution of [Table 1]. For this, the DET module 301 uses for example a simplified assumption, according to which the streaming is carried out at the same level of resolution during the entire duration of the item of content, i.e., in this example for two hours, or 7200 seconds. Although it does not correspond to the operating reality of HTTP adaptive streaming (HAS), this assumption makes possible a good estimation of the amount of data that may be consumed as a result of streaming the item of content with each of the levels of resolution proposed in the manifest file 7.

Thus, for example, for a resolution of 320×180 pixels, the DET module 301 estimates a data consumption of: 600 kb/s*7200 s=4.32 Gb, i.e. 540 Mb. The result of all of the calculations made is summarised in the table below.

TABLE 2

| Resolution | Bitrate | Data |
|---|---|---|
| 320 × 180 pixels | 600 kb/s | 4.32 Gb (540 Mb) |
| 569 × 320 pixels | 1.2 Mb/s | 8.64 Gb (1.08 Gb) |
| 1024 × 576 pixels | 2.1 Mb/s | 15.12 Gb (1.89 Gb) |
| 1280 × 720 pixels | 3 Mb/s | 21.6 Gb (2.7 Gb) |
| 1920 × 1080 pixels | 5 Mb/s | 36 Gb (4.5 Gb) |

Firstly a first case is considered, wherein the terminal 30 knows the data bucket of the user customer. This data bucket corresponds for example to a data volume associated with a prepaid card that they have acquired from the operator of the mobile network 1. It may also correspond to a monthly plan that they have signed up to with this operator, for example a plan of 50 Gb/month.

In the case where the HAS service is end-to-end controlled by the operator of the mobile network 1, the data bucket of the user is known by the operator, from the offer that the user signed up to, or from their billing information. Therefore, the operator transmits this information to the terminal 30.

As a variant, this data bucket may also be entered by the users themselves. It may for example be entered via the interface of the rendering terminal TX (smartphone 3, or television 5 for example), during a phase for installing the HAS service, or in response to a request from the provider of this service, for example via a "pop-in" window informing the user of new functionalities or new features in the service.

The example of a data bucket of 50 GB/month is therefore considered, the customer of which would have already consumed 10 GB during the current month. Once again, the knowledge of the current consumption of the customer may be provided by the operator of the mobile network 1, or by the customer himself/herself.

The DET module 301 may then easily determine, for each of the resolutions proposed in the manifest file 7, the proportion of the data bucket that will be consumed in the event of streaming of the item of content at this resolution, and the proportion of this bucket that will remain for the customer after streaming, depending on their current monthly consumption. The result of the calculations made by the DET module 301 may be displayed, for example in the form of the table [Table 3] below, on the screen of the rendering terminal TX.

TABLE 3

| Resolution | Bitrate | Data | % Bucket | % Bucket remaining after consumption at |
|---|---|---|---|---|
| 320 × 180 pixels | 600 kb/s | 4.32 Gb (540 MB) | 1.08% | 78.92% |
| 569 × 320 pixels | 1.2 Mb/s | 8.64 Gb (1.08 GB) | 2.16% | 77.84% |
| 1024 × 576 pixels | 2.1 Mb/s | 15.12 Gb (1.89 GB) | 3.78% | 76.22% |
| 1280 × 720 pixels | 3 Mb/s | 21.6 Gb (2.7 GB) | 5.4% | 74.6% |
| 1920 × 1080 pixels | 5 Mb/s | 36 Gb (4.5 GB) | 9% | 71% |

Thus, by simply consulting the screen of the rendering terminal TX, the customer knows that by streaming the item of content C1 at an encoding rate of 2.1 Mb/s, he/she will consume 7200*2.1=15.12 Gb, i.e. 15.12/8=1.89 GB. Insofar as his/her data bucket is of 50 GB, this therefore represents 1.89 GB*50 GB/100=3.78% of his/her monthly data bucket. In addition, as he/she has already consumed 10 GB of data since the beginning of the month, i.e. 20% of his/her data bucket, he/she will have left, after streaming the item of content C1 at this resolution of 1024×576 pixels, 100%−20%−3.78%=76.22% of his/her monthly data bucket.

The terminal 30 then proposes to the customer, based on this knowledge of its level of consumed data bucket and remaining after streaming, to define an upper limit of the encoding rate of the item of content to be streamed: the various fragments of the item of content C1 will then not be able to be streamed at an encoding rate higher than this upper limit selected by the user.

In this example, the users decide for example that they desire to view the item of content C1, but without exceeding 7% of consumption of their data bucket: they therefore choose to restrict the streaming of fragments of the item of content to a maximum resolution of 1280×720 pixels.

For this, they use the interface of the rendering terminal TX. For example, on the screen of the television 5, they select, by means of a remote control, one of the rows of the table [Table 3], which is highlighted for example. In another example, they select this maximum authorised encoding rate by clicking on the appropriate row of the table [Table 3] displayed on the touch screen of the smartphone 3. Any other type of interface configuration may also be used, such as a banner, a "pop-in" window, etc.

It will be noted that the multimedia stream player terminal 30 may itself make this selection, without intervention of the user, for example by applying a precautionary principle regarding the consumption of the databucket. It may also encourage the user to select a low maximum authorised encoding rate value, for example by highlighting on the screen of the rendering terminal a recommended maximum encoding rate value, depending on the proportion of the data bucket remaining after streaming. The user then simply has to confirm or cancel this pre-selection.

The selected value feeds the selection module SEL 302, which communicates it to the HAS module 303, so as to restrict the streaming of fragments of content to a maximum encoding rate of 3 Mb/s chosen by the user.

Thus, as illustrated in FIG. 3, the HAS client module 303 will successively stream (312) the fragments $C1_2@N3$, $C1_3@N3$, $C1_4@N2$, $C1_5@N1$ and $C1_6@N3$, that is to say, stream the best possible quality fragment depending on the network constraints, but without ever exceeding the maximum value MAX 311 of the encoding rate, which was selected by the user as being equal to 2100 kb/s.

Thus, if after having streamed the fragments $C1_2$@N3, $C1_3$@N3, $C1_4$@N2 and $C1_5$@N1, the HAS client module 303 determines, depending on the network conditions, that the optimal time fragment bitrate at which it may be entitled is 5000 kb/s, it does not launch the streaming of the next fragment at this optimal bitrate, but streams the time fragment $C1_6$@N3, at the maximum encoding rate authorised by the customer.

A second case is now considered, wherein the multimedia stream player terminal 30 has no knowledge of the data bucket of the user. In this case, the DET module 301 for determining the consumed data volume may only determine the absolute value of the consumed data volume by streaming the item of content C1 at the various levels of resolution proposed in the manifest file 7, and not its relative value in relation to the data bucket. In other terms, only the data of the table [Table 2] may be displayed, on action of the display command module DISP 300, on the screen of the rendering terminal TX. Thus, the level of consumption of the multimedia stream C1 at its various encoding rates is simply shown, and the user must make a selection of the maximum encoding rate that they authorise depending only on the number of GB consumed at each of the bitrates.

As the user most often has knowledge of their data bucket, they may perform a quick head calculation to help them make a decision. Thus, if they want to view the VOD C1, they may be prepared to consume 2.7 GB of their monthly data bucket, even if it means restricting their consumption for the rest of the month on other services or applications. In this case, they select, in the table [Table 2], the resolution of 1280×720 pixels, and the associated maximum encoding rate of 3 Mb/s. Once again, the configuration of the interface of the rendering terminal TX making this selection possible may take any appropriate form.

In this second case, data are therefore displayed on the screen of the rendering terminal making it possible for the user to better understand the impact of the streaming of the item of content C1 on their data consumption, so that they have the necessary tools to adapt their content consumption, depending on their capacities.

It will be noted that, in one embodiment, the selection of the maximum encoding rate MAX 311 is effective for only the item of content C1 during HAS. As a variant, this selection may apply to all multimedia streams accessible via the content server 2, or to all of the multimedia streams that the user will stream during a given period (for example the current month in the event of monthly plan), or for a given period during which the user is in mobility situation.

In another embodiment, the DISP module 300 does not display all of the rows of the tables [Table 2] and [Table 3] on the screen of the rendering terminal TX, but only the rows corresponding to the encoding rates that do not result in the data bucket of the user being exceeded. In other words, the customer is only offered the encoding rates they are entitled to in order to be able to at least view the entire item of content C1, if they do not have enough consumable data left to view it at the maximum available quality.

The example of an item of content C1 of the video on demand (VOD) type was given above. It will be noted that the item of content C1 may also be a replay television programme, or a live television programme. In the latter case, the duration of the programme necessary for the calculation by the DET module 301 of the consumed data volume may be extracted from the electronic program guide (EPG).

In its various embodiments, the present development may be implemented on set top boxes, on the CléTV® from Orange® and generally on all of the terminals consuming videos in HAS during mobility (on mobile network).

The invention claimed is:

1. A method of managing HTTP adaptive streaming of an item of digital content within a multimedia stream player terminal connected to a mobile communication network, the multimedia stream player terminal comprising a device for managing HTTP adaptive streaming of the item digital content,
   the item of digital content being associated with a file for describing the item of digital content, comprising a list of time segments of the item of content each associated with a plurality of encoding rates of the item of content,
   a maximum data volume to be consumed within the mobile communication network, as a data bucket, being allocated to the multimedia stream player terminal,
   wherein, when the HTTP adaptive streaming of the digital content is launched, the management method being implemented by the device for managing HTTP adaptive streaming according and comprising:
      determining a data volume that would be consumed by the multimedia stream player terminal as a result of streaming the time segments of the item of content at least some of the encoding rates; and
      selecting a maximum encoding rate of the item of content authorized for the streaming on the basis of the consumed data volume associated therewith and of the data bucket;
      wherein the selection comprises a pre-selection by the multimedia stream player terminal of the maximum encoding rate, a user being able to confirm or deny the pre-selection.

2. The management method according to claim 1, further comprising displaying, on a rendering terminal associated with the multimedia stream player terminal, the consumed data volumes determined for at least some of the encoding rates.

3. The management method according to claim 2, further comprising displaying the consumed data volumes, determined for at least some of the encoding rates, in the form of a proportion of the data bucket.

4. The management method according to claim 2, further comprising displaying, on the rendering terminal, of a data volume yet to be consumed by the multimedia stream player terminal, at the end of the streaming of the time segments of the item of content at least some of the encoding rates.

5. The management method according to claim 2, wherein the displayed data volumes correspond only to the encoding rates for which the streaming of the time segments of the item of content does not result in the data bucket being exceeded.

6. The management method according to claim 1, further comprising entering, on a rendering terminal associated with the multimedia stream player terminal, of the data bucket.

7. A processing circuit comprising a processor and a memory, the memory storing program code instructions of a computer program for implementing a method of managing HTTP adaptive streaming of an item of digital content within a multimedia stream player terminal connected to a mobile communication network, the multimedia stream player terminal comprising a device for managing HTTP adaptive streaming of the item digital content,
   the item of digital content being associated with a file for describing the item of digital content, comprising a list of time segments of the item of content each associated with a plurality of encoding rates of the item of content, a maximum data volume to be consumed within the mobile communication network, as a data bucket, being allocated to the multimedia stream player terminal, wherein, when the HTTP adaptive streaming of the digital content is launched, the management method being implemented by the device for managing HTTP adaptive streaming according and comprising:

determining a data volume that would be consumed by the multimedia stream player terminal as a result of streaming the time segments of the item of content at least some of the encoding rates; and selecting a maximum encoding rate of the item of content authorized for the streaming on the basis of the consumed data volume associated therewith and of the data bucket, when the program is executed by the processor;

wherein the selection comprises a pre-selection by the multimedia stream player terminal of the maximum encoding rate, a user being able to confirm or deny the pre-selection.

8. A device for managing HTTP adaptive streaming of an item of digital content within a multimedia stream player terminal connected to a mobile communication network, the item of digital content being associated with a file for describing the item of digital content, comprising a list of time segments of the item of content each associated with a plurality of encoding rates of the item of content, a maximum data volume to be consumed within the mobile communication network, as a data bucket, being allocated to the multimedia stream player terminal, the device comprising processing circuitry configured to:

determine a data volume that would be consumed by the multimedia stream player terminal as a result of streaming the time segments of the item of content at least some of the encoding rates; and select a maximum encoding rate of the item of content authorized for the streaming on the basis of the consumed data volume associated therewith and of the data bucket;

wherein the selection comprises a pre-selection by the multimedia stream player terminal of the maximum encoding rate, a user being able to confirm or deny the pre-selection.

9. The device for managing the HTTP adaptive streaming of an item of digital content according to claim 8, wherein the processing circuitry is further configured to transmit a command, to a rendering terminal associated with the multimedia stream player terminal, for displaying the consumed data volumes determined for at least some of the encoding rates.

10. A multimedia stream player terminal, comprising a device for managing the HTTP adaptive streaming of an item of digital content within the multimedia stream player terminal connected to a mobile communication network, the item of digital content being associated with a file for describing the item of digital content, comprising a list of time segments of the item of content each associated with a plurality of encoding rates of the item of content, a maximum data volume to be consumed within the mobile communication network, as a data bucket, being allocated to the multimedia stream player terminal, the device comprising processing circuitry configured to:

determine a data volume that would be consumed by the multimedia stream player terminal as a result of streaming the time segments of the item of content at least some of the encoding rates; and select a maximum encoding rate of the item of content authorized for the streaming on the basis of the consumed data volume associated therewith and of the data bucket;

wherein the selection comprises a pre-selection by the multimedia stream player terminal of the maximum encoding rate, a user being able to confirm or deny the pre-selection.

* * * * *